April 6, 1943.　　　O. F. MACLAREN　　　2,315,901
ENDLESS TRACK ELEMENT FOR AIRCRAFT AND LAND VEHICLES
Filed Oct. 27, 1941　　　2 Sheets-Sheet 2
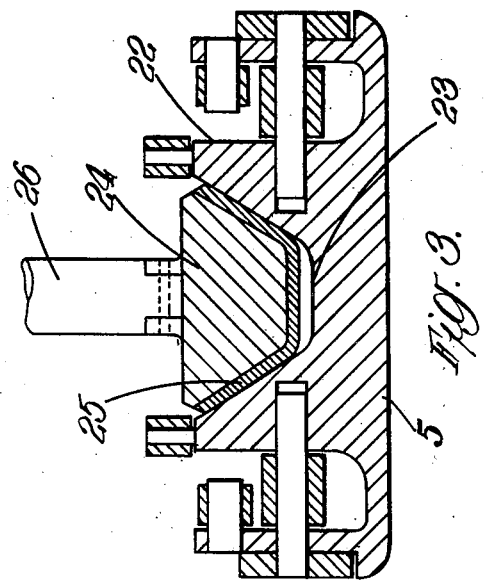
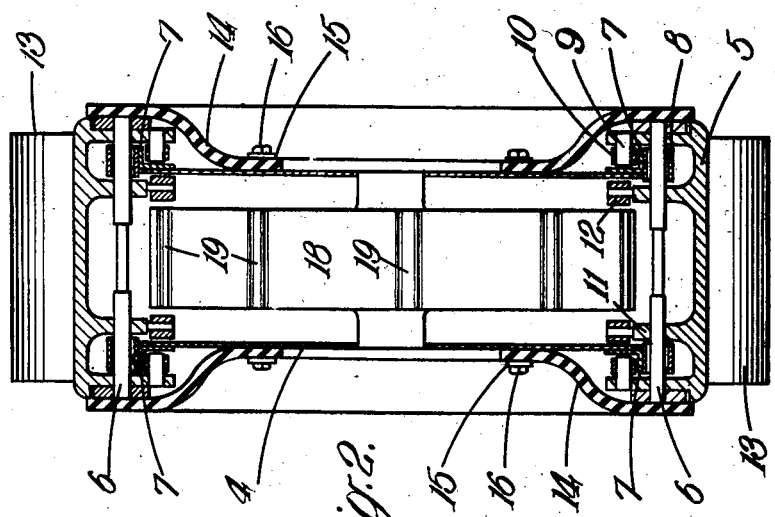

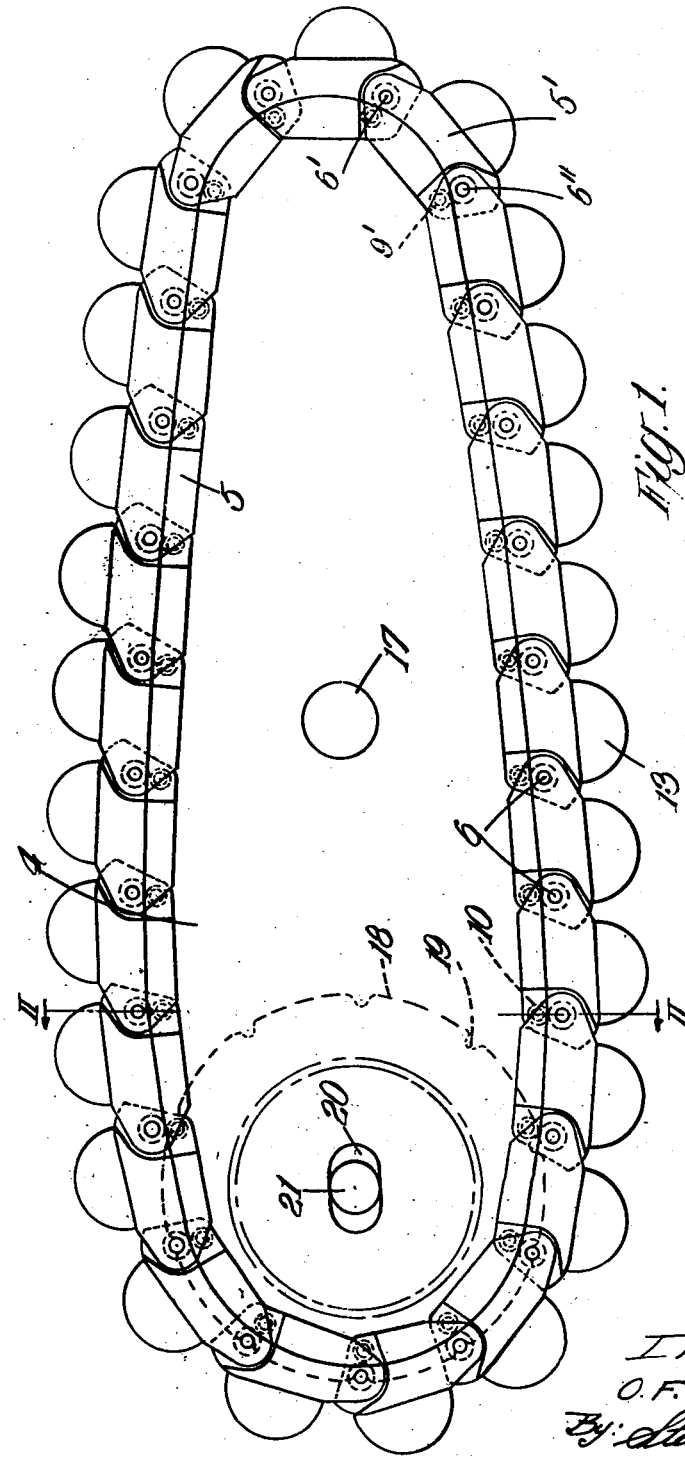

Patented Apr. 6, 1943

2,315,901

UNITED STATES PATENT OFFICE 2,315,901

ENDLESS TRACK ELEMENT FOR AIRCRAFT AND LAND VEHICLES

Owen Finlay Maclaren, West Drayton, England, assignor to Maclaren Undercarriage Company Limited, London, England Application October 27, 1941, Serial No. 416,750
In Great Britain July 16, 1940

7 Claims. (Cl. 305—4)

This invention relates to endless track running elements which may virtually be regarded as a substitute for wheels, being, in fact, each the equivalent of a wheel distorted to provide a greater supporting area than that which is provided by an ordinary circular wheel of even very much greater area. Although primarily devised for employment as the landing element in aircraft alighting gear, it is to be understood that the endless track running element in accordance with the present invention may in some cases find useful application in land vehicles, particularly where such vehicles are to be converted for military and agricultural use, either permanently or in the case of emergency.

It is useful now to make it clear that in the ensuing description and claims, the expression endless track running element is employed to designate the unit which can virtually be regarded as a substitute for a wheel. To avoid any confusion the ground engaging portion of the endless track running element will be referred to throughout as the track band.

The present invention consists in an endless track running element comprising a body of elongated form about which a track band composed of articulated link members is rotatable, the link members including rotatable bearing members supporting the links upon the body. In the preferred construction the nature and disposition of the rotatable bearing members are such as to prevent centrifugal loads on the track band in rotation tending to separate it from the body. Likewise, in some cases bearing means may be provided between the individual articulated link members and the body to resist lateral displacement of the track band. Provision may be made for braking the track band, and though it is preferred to apply the braking loads directly to the track band, they may in some cases be applied to the track band through a brake drum associated with a sprocket wheel having driving connection with the track band. Likewise, if the track band is to be driven, the drive may be transmitted to a driving sprocket housed within the body of the endless track running element and driven by any conveniently available means.

It is preferred that such resilience as is afforded by the endless track running element per se shall be provided by resilient members carried by the ground engaging surface of the links constituting the track band. In that connection it should again be borne in mind that the endless track running element is virtually a substitute for a wheel and therefore the aircraft undercarriage component or the vehicle suspension system mounting the endless track running element, will provide the main part of the requisite resilience.

In order that it may be clearly understood and readily carried into effect, the invention is hereinafter described with reference to the accompanying diagrammatic drawings, of which:

Figure 1 is a side elevation of an endless track running element according to the invention;

Figure 2 is a section on the line 2—2 of Figure 1;

Figure 3 is a fragmentary section taken transversely through one of the articulated link members constituting the track band to illustrate a method of braking as applied directly to the track band.

Referring now to Figures 1 and 2 of the drawings, the body of the endless track running element is indicated by the reference numeral 4. Rotating about the body in the manner of the track band usually provided on endless track running elements, is a track band constituted by individual link members 5. Each link member has at its end a pin joint, including spindles 6 extending transversely of the individual links and passing through the side cheeks thereof to engage the side cheeks of an adjacent link and it thus follows that the track band is built up into a continuous member.

The manner of supporting the track band on the body 4 is more clearly seen with reference to Figure 2. Thus the periphery of the body 4 is provided with the outwardly extending side flanges 7, which provide a running surface for the roller bearings 8 mounted on the spindles 6. The cheeks of the individual articulated links 5 also mount the short stub pins 9 which, in their turn, support the roller bearing members 10 running on the inner face of the flange 7.

In some cases, the articulated link members 5 may be provided internally of the walls of the body part 4 with upstanding lug members 11 which, in their turn, mount roller bearings 12 running on the inner surface of the walls of the body part 4, but in many cases provision of the additional internal lugs and bearing rollers may be unnecessary. As indicated in Figure 1, the articulated links 5 are preferably each provided with pads 13 which may be resilient and are preferably readily renewable.

A feature which has been illustrated in Figure 2 but which for clarification of Figure 1 has been omitted, is the provision of an edge seal 14, preferably comprising a suitably shaped moulded bead of synthetic rubber, leather, or other suitable material, attached to the body 4 by the strip 15 and secured by the bolts. The purpose of the edge seal 14 is, of course, to prevent mud and grit finding its way too readily into the bearing members.

A point which will be noted in Figure 1 is that in the assembled condition of the endless track running element the bearings 8 and 10, as shown in dotted lines, are slightly offset (i. e., the point of contact of each bearing member with its cooperating surface of the flange 7 is tangential but the tangents are not on a line extending between the centres of the spindles and the short stub pins 9, except where the track is running round the more sharply curved end portions of the body), and it follows that a certain amount of clearance may be provided thereat between the flange 7 and the roller bearings 8 and 10. That clearance is of advantage in one respect in that by removing a pin joint extending between two articulated links at a suitable point on the band, e. g., in this case the spindle 6', the link member 5' can be swung away from the body about the pin joint 6" to enable access to be obtained to the short stub arm 9'. When the link 5' has been removed, the other links can be brought round into the same position and removed from the track band in the same way.

In an alternative proposal to facilitate removal of the track band, a part of the flange 7 may be removable or may even be entirely omitted at a certain point, in which event it is possible to remove the track band in one piece after one of the spindles has been taken out.

The body of the endless track running element is provided with a fitting by means of which it can be attached to a stub axle or landing element spindle, the point of attachment being indicated in Figure 1 by the spindle housing represented by the reference numeral 17.

The sprocket 18 may be provided to afford means of braking and/or driving the track band and at the same time, it may provide a convenient means for taking up stretch of the track band. The sprocket has recesses 19, seen in dotted lines in Figure 1, spaced for engagement with the spindles 6, thus braking or driving of the drum is transmitted to the track band. If the sprocket 18 is to be driven, it is convenient to enclose a hydraulic, electric or other remotely controllable motor within the body 4.

It will be realised that in the endless track running element hereinbefore described, a reasonable amount of wear occurring in normal use will not permit undue outward movement of the links 5, and therefore the provision of means for adjusting the length of the track band will in most cases be unnecessary. It will, however, be seen that in Figure 1 there has been indicated an elongated bearing aperture 20 provided for housing the spindle 21 of the sprocket 18 in the walls of the body 4. Any convenient bearing means may be provided for locating the spindle 21 and for providing adjustment within the range permitted by the dimensions of the elongated bearing slot 20. If a small adjustment is to be provided for the flange 7 may be continued right round the curve at the forward end of the body, but if considerable adjustment is likely to be required, the flange 7 may be discontinued round the forward end of the body. In that connection it will be realised that as the bearings leave the top run of the flanges 7, the spindles 6 are received in the recesses 19 of the sprocket and are delivered on to the forward end of the bottom run of the flange 7.

Referring now to Figure 3, there is in this case illustrated a slightly modified form of link devised to enable the braking loads to be applied directly to the track band. Thus each link includes an inwardly projecting central rib 22 extending into the track body and provided internally with a recess 23 extending longitudinally of the link. The brake shoe 24 carries the brake lining 25 and the shoe is pressed down into the recess 23 to achieve the braking action. The brake applying mechanism may be fluid actuated, in which case one or more of the supporting and actuating arms 26 carrying the brake shoe 24 may form the extension of the plunger of a jack remotely controllable by fluid pressure means. Alternatively, the arms 26 may be associated with a linkage system where mechanical brake application is required.

It is to be understood that where in the following claims the body of the endless track running element has been stated to be of elongated form, the expression is intended to signify not so much that the body is elongated to any greater extent than is the usual endless track running element, but rather that the elongation is to be regarded as elongation relative to a circular wheel of corresponding area. The essential feature of the endless track running element in common with that of ordinary endless track elements is that it should present to the ground a substantially flat tread portion.

What I claim is:

1. An endless track running element comprising a body of elongated form having side walls and edge flanges directed outwardly from the walls to present laterally at each side of the body inner and outer substantially horizontal bearing surfaces, a track band rotatable about the body and constituted by pivotally connected links, and rotatable bearing members engaging said inner and outer bearing surfaces and carried by said track band.

2. An endless track running element comprising, a body of elongate form, a track band rotatable about the body, said track band being comprised of a plurality of articulated links, means defining a bearing surface extending marginally of said body in a plane normal to the plane thereof, and a plurality of anti-friction bearing elements each carried by a link of said track band, said bearing elements being disposed in bearing relation against said bearing surfaces with the means defining said bearing surfaces lying between said bearing elements and the tread of the respective link, whereby the track band is constrained against movement away from the body.

3. An endless track running element comprising, a body of elongate form, a track band rotatable about the body, said track band being comprised of a plurality of articulated links, means defining a bearing surface extending marginally of said body in a plane normal to the plane thereof, a plurality of anti-friction bearing elements each carried by a link of said track band, said bearing elements being disposed in bearing relation against said bearing surfaces with the means defining said bearing surfaces lying between said bearing elements and the tread of the respective link, and separate anti-friction bearing elements holding said links against lateral displacement from said body.

4. An endless track running element comprising, a body of elongate form, a track band rotatable about the body, said track band being comprised of a plurality of articulated links, anti-friction bearing means for holding said track against lateral displacement with respect to said body, anti-friction bearing means for holding said track against movement away from said body, and anti-friction bearing means for absorbing the load on said track tending to move the track inwardly toward the body, each of said bearing means being freely rotatable about its own axis, the axis of each bearing means lying in a plane normal to the plane of movement which it constrains.

5. An endless track running elements as claimed in claim 4 in which each of the resilient links constituting the track band is provided with an external resilient pad constituting its tread surface.

6. An endless track running elements as claimed in claim 4 further comprising, resilient means connected to said body and extending marginally thereof in skirting relation with respect to all of the bearing means to protect the latter against grit.

7. In an endless track construction including an endless track running element, a supporting body therefor, and a brake supported from said body and acting directly on said track running element to urge the latter in a direction away from said body, anti-friction bearing means for holding said track running element against movement away from said body, the axes of said bearing means lying in a plane normal to the plane of movement of said braking element, whereby the braking thrust will be absorbed by the anti-friction bearing means to thereby hold the track against movement away from said body.

OWEN FINLAY MACLAREN.